(12) United States Patent (10) Patent No.: US 8,799,015 B2
Goodnight et al. (45) Date of Patent: Aug. 5, 2014

(54) WELLCARE MANAGEMENT METHODS AND SYSTEMS

(75) Inventors: David B. Goodnight, Kerrville, TX (US); Steven R. Johnson, St. Genevieve, MO (US); Thomas J. Blair, Chesterfield, MO (US)

(73) Assignee: Nestec SA, Vevey (CH)

( * ) Notice: Subject to any disclaimer, the term of this patent is extended or adjusted under 35 U.S.C. 154(b) by 176 days.

(21) Appl. No.: 13/317,149

(22) Filed: Oct. 11, 2011

(65) Prior Publication Data

US 2013/0090940 A1 Apr. 11, 2013

(51) Int. Cl.
*G06Q 50/00* (2012.01)
*G06Q 10/00* (2012.01)

(52) U.S. Cl.
USPC ............................................................ 705/2

(58) Field of Classification Search
CPC . G06Q 50/22; G06Q 10/00; G06Q 10/06375; G06Q 30/00; G06Q 30/0222; G06Q 30/0283
USPC ........................................................ 705/2–3
See application file for complete search history.

(56) References Cited

U.S. PATENT DOCUMENTS

| 2002/0069090 | A1* | 6/2002 | De Grosz et al. | 705/4 |
| 2003/0191711 | A1* | 10/2003 | Jamison et al. | 705/40 |
| 2009/0030910 | A1* | 1/2009 | Bennett et al. | 707/10 |

* cited by examiner

*Primary Examiner* — Minnah Seoh
(74) *Attorney, Agent, or Firm* — Julie M Lappin; Janet E. Reed

(57) ABSTRACT

Methods and systems related to wellcare management are disclosed. The methods comprise enrolling wellcare providers and consumers, offering wellcare plans, and providing automated payment processing and collection in connection with the wellcare plans. The methods also allow the wellcare management systems to interface with the wellcare provider's practice management software administered by a third party. Preferably, the wellcare plan providers are veterinarians, particularly independent veterinarians. Systems employing the methods over one or more computer networks are also disclosed, as are articles comprising computer readable media.

21 Claims, 10 Drawing Sheets

WELLCARE MANAGEMENT METHODS AND SYSTEMS

BACKGROUND OF THE INVENTION

1. Field of the Invention

The invention relates generally to wellcare management methods and systems and particularly to wellcare management methods and systems suitable for use by veterinarians.

2. Description of Related Art

Wellcare health management systems are essentially a form of managed care, combining a variety of techniques to reduce the cost of providing health benefits and improve the quality of care. Managed care encompasses programs intended to reduce unnecessary health care costs through a variety of mechanisms, including: (1) programs that provide economic incentives that reward both the health care providers and patients for selecting less costly forms of care; (2) programs for reviewing the medical necessity of specific services; (3) increased beneficiary cost sharing; (4) controls on inpatient admissions and lengths of stay; (5) establishing cost-sharing incentives for outpatient surgery; (6) selective contracting with health care providers; and (7) intensive management of high-cost health care cases.

Most efforts at medical and veterinary care are focused on treatment. While some programs offer a wellness component, few programs have focused primarily on wellcare, or are solely dedicated to wellcare management. Fewer still have been focused on veterinarian practice or animal health and wellness.

One large chain of veterinary clinics currently offers a "prepaid wellness plan" but those plans are 100% specific to corporately owned practices and not available to individual, privately owned practices. Such prepaid wellness plans also cannot be customized, e.g., by veterinary practice.

The occasional veterinarian offers clients a wellness plan(s) but these plans are typically 100% pre-paid, typically because of associated legal and administrative challenges associated with implementing and managing the plan.

There is, therefore, a need for new wellcare management methods and systems, particularly wellcare management systems suitable for use by veterinarians.

SUMMARY OF THE INVENTION

It is, therefore, an object of the invention to provide wellcare management methods for health care and veterinary health care providers (such as hospitals, clinics, surgical centers, health centers, small group practices, and single practitioner offices) that utilize a variety of techniques intended to reduce the cost of providing health benefits and improve the quality of care for the patients.

It is, therefore, an object of the invention to provide wellcare management systems for health care and veterinary health care providers (such as hospitals, clinics, surgical centers, health centers, small group practices, and single practitioner offices) that utilize a variety of techniques intended to reduce the cost of providing health benefits and improve the quality of care for the patients.

It is another object of the invention to provide health care providers, especially veterinarians, and more particularly independent veterinarians, with the ability to provide wellcare programs for their patients.

It is a further object of the invention to provide wellcare method and systems that do not require 100% prepayment and yet do not overwhelm the health care provider with administrative and collection costs.

It is yet another object of the invention to provide a system and software that allow health care providers including veterinarians to offer wellcare programs comprising a fully customizable bundle of services.

These and other objects of the invention are achieved through the use of wellcare management systems and methods that facilitate the management of wellcare for providers and practitioners.

Other and further objects, features, and advantages of the present invention will be readily apparent to those skilled in the art.

DETAILED DESCRIPTION OF THE INVENTION

Definitions

Figure 1:
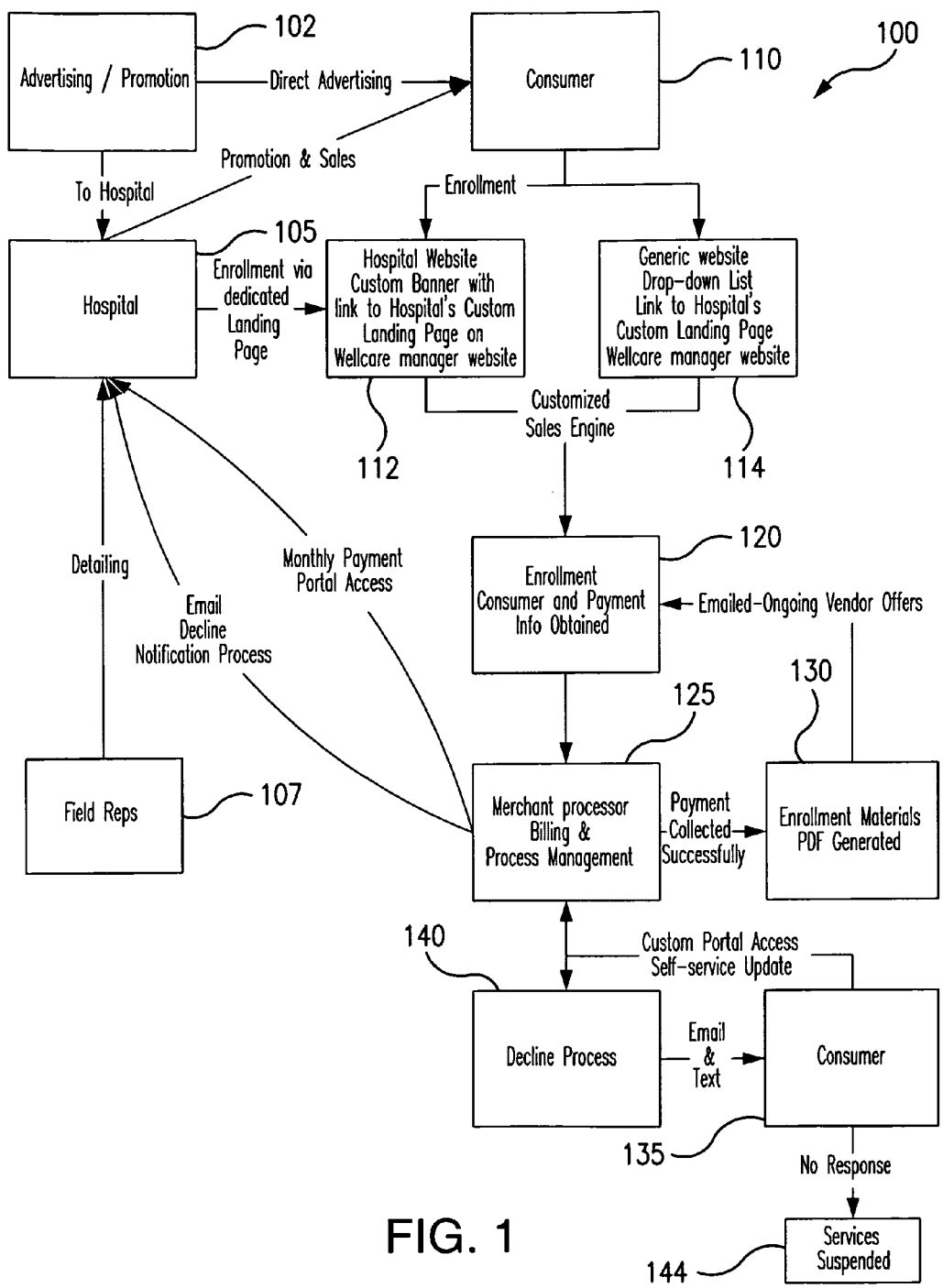
FIG. 1 shows an overview of one embodiment of the automated wellcare management process.

Unless expressly defined otherwise, all technical and scientific terms, terms of art, and acronyms used herein have the meanings commonly understood by one of ordinary skill in the art in the field(s) of the invention, or in the field(s) where the term is used. In accordance with this description, the following definitions and/or abbreviations apply.

As used herein, the singular form of a word includes the plural, and vice versa, unless the context clearly dictates otherwise. Thus, the references "a", "an", and "the" are generally inclusive of the plurals of the respective terms. For example, reference to "a method" includes a plurality of such "methods."

The words "comprise", "comprises", and "comprising" are to be interpreted inclusively rather than exclusively. Likewise the terms "include", "including" and "or" should all be construed to be inclusive, unless such a construction is clearly prohibited from the context. Further, forms of the terms "comprising" or "including" are intended to include embodiments encompassed by the phrases "consisting essentially of" and "consisting of". Similarly, the phrase "consisting essentially of" is intended to include embodiments encompassed by the phrase "consisting of".

Where used herein, ranges are provided in shorthand, to avoid having to list and describe each and every value within the range. Any appropriate value within the range can be selected, where appropriate, as the upper value, lower value, or the terminus of the range.

The methods, systems, and other advances disclosed herein are not limited to particular methodology, protocols, and techniques described herein because, as the skilled artisan will appreciate, they may vary. Further, the terminology used herein is for the purpose of describing particular embodiments only, and is not intended to, and does not, limit the scope of that which is disclosed or claimed.

Although any devices, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by applicable law. Any discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

As used herein, a health care "provider" refers to a hospital, clinic, center, practice, facility, office, or mobile unit wherein a doctor, veterinarian, or the like, provides any health care services to a person or animal of any kind (particularly companion animals). "Provider" is also used herein to refer to any licensed health care or medical practitioner or the like including any nurse, doctor, or veterinarian, or other professional that provides health care services to a patient.

As used herein, "patient" refers to the human or animal being checked, screened, treated, or the like by any doctor, veterinarian, or health care practitioner. The terms patient and pet are used interchangeably herein. Sometimes the text states "patient or pet" to be completely clear that pets are intended. The term pet as used herein is synonymous with "companion animal" and refers to any animals that provide companionship or are treated as companions by a human caregiver.

As used herein, the term "consumer" indicates a human consumer of medical care, heath care, or wellcare. Consumer also includes any human who is ultimately responsible and financially accountable for the health care of an animal, such as a pet or companion animal. Thus while a patient may be a human or an animal, a consumer will always be a human capable of entering legal or financial agreements for their own care or the care of one who is dependent on that consumer (whether a human dependent or an animal).

As used herein the term "doctor" includes all medical and veterinarian professionals and practitioners that check-up, screen, or treat any patient, including any specialists, assistants, nurse practitioners, or the like. Thus, the terms "doctor" and "veterinarian" are used interchangeably regardless of whether referring to doctors whose patients are humans, or whose patients are animals, especially including doctors (veterinarians) whose patients are companion animals.

As used herein, the term "wellcare manager" refers to an entity that manages one or more administrative aspects of a wellcare management system, i.e. one or more aspects of the relationship between the provider and the consumer with respect to the wellcare management system.

As used herein the term "merchant processor" refers to the relationship with payment collection from consumers. The merchant processor role may be carried out by the wellcare manager, or by a third party that specializes in merchant process, including credit card or debit processing, electronic checks, electronic funds transfer or collecting and/or processing other payment from consumers.

The Invention

In one aspect, the invention provides methods for wellcare management. The methods are preferably administered by a wellcare manager and generally comprise the steps of:
a. enrolling a plurality of wellcare providers;
b. enrolling one or more consumers for each enrolled provider;
c. for each provider, offering one or more wellcare plans to consumers;
d. allowing the consumers to select from the one or more wellcare plan offerings;
e. permitting consumers to enroll one or more patients per plan;
f. for each consumer, obtaining contact and financial information sufficient to permit automated collection by a merchant processor of a periodic payment associated with the selected wellcare plan;
g. for each provider, obtaining financial information sufficient to permit payment of service fees to the provider from the wellcare manager;
h. collecting and/or processing periodic payments from consumers using automated payment management including approval and/or decline notification and management thereof;
i. for each consumer enrolled, managing renewals and/or nonrenewals; and
j. providing access over a network via a secure portal to providers and consumers to information about the wellcare plans and payments; wherein steps (a) through (j) occur on one or more computer networks.

In various embodiments, each offered plan provides one or more of: (i) a different wellcare service or bundle of wellcare services; (ii) one or more periodic payment requirements or options for the plan; and (iii) one or more terms for the plan.

In certain embodiments, the step of managing renewals and/or nonrenewals comprises timely communication with the consumers, for example communication within 30, 60, or 90 days of the expiration date of the current plan, or of an automatic renewal date for the current plan.

In certain embodiments, the method further comprises the step of creating and maintaining one or more databases. For each enrolled provider, the database can contain data related to one or more of (1) contact information for the provider; (2) an identifier unique for the provider; (3) financial information sufficient to permit payment of service fees to the provider from the wellcare manager; (4) the content of one or more provider wellcare plan offerings; (5) operative and/or effective dates for each of the one or more provider wellcare plans; (6) any changes to the one or more provider wellcare plan offerings and effective dates of the changes; (7) records of notice of the changes to the consumers; (8) records of receipt and/or acceptance of such notice by the consumers; (9) information related to each enrolled consumer and each patient enrolled thereunder for each wellcare plan offered by that provider; (10) enrollment and/or payment status for each enrolled consumer including the status of any payment problems or denials. For each consumer, the database can contain data related to one or more of: (1) contact information for the consumer; (2) information to associate the consumer with an enrolled provider; (3) information identifying the wellcare plan offering(s) for which the consumer has enrolled; (4) information for each patient enrolled in each wellcare plan; (5) an account history for the consumer; (6) financial information sufficient to permit electronic collection of payments due by the merchant processor; (7) payment preference(s) for the consumer; (8) renewal or non-renewal information for the consumer; and (9) information related to access by the consumer to a secure portal providing information about the plan.

In certain embodiments, the step of providing access over a network to a secure portal comprises particular features for the enrolled providers or consumers. For instance, for the enrolled providers, the portal can allow access to data in the database related to the provider; the wellcare plan offerings; approval status for completed consumer applications; the enrolled consumers and/or patients for that provider; status of payment of service fees to the provider from the wellcare manager; payment and/or enrollment status for each consumer or patient associated with that provider; decline notifications for any consumer associated with that provider; and/or renewal status for each consumer. For enrolled consumers, the portal can allow access sufficient for managing that consumer's data in the database as to consumer contact information, services selected, enrolled patients, financial information, and/or preferred methods of payments; accessing account history, payment history, and/or service history; rectifying payment issues or declines, and making renewal decisions.

In one embodiment, the providers are veterinarians. In another embodiment, the wellcare plan offerings comprise one or more wellcare services bundled for a defined time, e.g., for a term of one year.

Typically, the periodic payments are monthly payments, although any period is sufficient for the payments, e.g., weekly or quarterly. In various embodiments, the wellcare plans require a one-time enrollment fee that is paid to a wellcare manager.

In certain embodiments, at least a portion of the one or more computer networks is non-public, or private. Non-public networks for purposes herein include password-restricted networks, encrypted networks, paid networks, membership networks, and other networks not open to the general public. The database is preferably kept private and maintained securely. The security can be based, for example, on industry standards and legal requirements for financial data and/or health records. Preferably, the database security meets or even exceeds those industry standards.

The method further comprises the step of interfacing information gathered from any of steps (a) through (j) with a provider's practice management system software. The information gathered is information about a consumer that is entered into a client's file in the practice management system software. The practice management system software is preferably administered by a third party in various embodiments.

In certain embodiments, the payments are processed by a third party merchant processor and/or the entire method is conducted by a wellcare manager. Such a partner provides services to health care providers by managing the wellcare system, to enable even small and independent health care providers to offer wellcare plans that might otherwise be cost-prohibitive to manage for a small practice, clinic, or hospital.

In various embodiments, the one or more networks include a public network, such as the internet or similar network. In other embodiments, the networks also include a private or non-public network, such as a banking network or payment network. In some embodiments, the private or non-public networked includes a preferably secure connection with a public network. In yet other embodiments, the banking or payment networks are secured networks that are carried over public networks but are encrypted and/or password protected, or otherwise non-public in nature.

In addition to being carried out on one or more networks, the methods can be carried out on any of a variety of networked devices including personal computers, netbooks, tablet computers, terminals, smart phones, PDAs, or other devices, including other hand-held devices.

The databases provided herein can be structured in any manner, and can be stored on any computer readable medium. The databases can be stored and/or accessed via a network, or can be stored and/or accessed locally. If a local copy of a database is used, it is preferred that such database be updated at least on a daily basis to obtain the most current data. The database can be backed up periodically, for instance at least hourly, or at least daily, using known methods. Data for a given provider can be provided for daily off-site back-ups by the provider as an added measure of security.

All financial data, health records, and other personal data can be maintained according to a pre-determined standard of data security and in accordance with all applicable legal requirements related to financial or health-related data, or for personal data. Preferably, a high standard of data security is selected.

In another aspect, the invention provides wellcare management systems. The systems are generally and preferably operated by a wellcare manager and/or a merchant processor. The wellcare management systems are useful for health care providers, including hospitals, clinics, doctors, veterinarians (including independent veterinarians and small group practices) and the like. The wellcare management systems allows providers to offer clients fully customizable packages that need not be fully prepaid, but rather can be paid periodically, such as by monthly payments or premiums. The systems generally comprise software or modules on one or more computer networks. The networks include one or more computers or other networked devices such as terminals, laptops, smart phones, tablet computers, PDAs, hand-held devices, or the like. The networks preferably include a publicly accessible network, for example, the interne for at least part of the functionality. The systems also include one or more data storage devices in data communication with the network for storing provider data and consumer data. The systems feature software for implementing the methods described herein, the software generally has a provider enrollment module, a consumer enrollment module, a payment collection module including decline processing module, a renewal module, a provider payment module, and optionally modules for provider payment verification and for interfacing with third party practice management software and/or electronic calendar programs.

The wellcare management systems generally comprise:
  a. a provider enrollment module for enrolling a plurality of wellcare providers;
  b. a consumer enrollment module for enrolling one or more consumers for each enrolled provider and one or more patients for each consumer into one or more wellcare plans offered by the enrolled provider;
  c. a payment collection module comprising billing and collection services including one or more of (i) periodic invoicing or billing of consumers; (ii) automated payment collection and processing; (iii) automated payment management including approval and/or decline notification and management; and (iv) renewal management;

d. a payment module for paying service fees to each enrolled provider, less any fees due the wellcare manager or merchant processor;

e. a database comprising: (i) for each enrolled provider, data related to one or more of (1) contact information for the provider; (2) an identifier unique for the provider; (3) financial information sufficient to permit payment of service fees to the provider from the merchant processor; (4) the content of one or more provider wellcare plan offerings; (5) operative and/or effective dates for each of the one or more provider wellcare plans; (6) any changes to the one or more provider wellcare plan offerings and effective dates of the changes; (7) records of notice of the changes to the consumers; (8) records of receipt and/or acceptance of such notice by the consumers; (9) information related to each enrolled consumer and each patient enrolled thereunder for each wellcare plan offered by that provider; and (10) enrollment and/or payment status for each enrolled consumer including the status of any payment problems or denials; and (ii) for each enrolled consumer, data related to one or more of: (1) contact information for the consumer; (2) information to associate the consumer with an enrolled provider; (3) information identifying the wellcare plan offering(s) for which the consumer has enrolled; (4) information for each patient enrolled in each wellcare plan; (5) an account history for the consumer; (6) financial information sufficient to permit electronic collection of payments due by the merchant processor; (7) payment preference(s) for the consumer; (8) renewal or non-renewal information for the consumer; and (9) information related to access by the consumer to a secure portal providing information about the plan;

f. a secure portal access module providing access: (i) for enrolled providers, wherein said portal allows access to data in the database related to the provider; the wellcare plan offerings; approval status for completed consumer applications; the enrolled consumers and/or patients for that provider; status of fee payments to the provider from the wellcare manager; payment and/or enrollment status for each consumer or patient associated with that provider; decline notifications for any consumer associated with that provider; and/or renewal status for each consumer; and (ii) for enrolled consumers, said portal allows access sufficient for managing that consumer's data in the database as to consumer contact information, services selected, enrolled patients, financial information, preferred methods of payments, and/or accessing account history, payment history, service history, rectifying payment issues or declines, and renewal decisions;

g. one or more servers providing access to the database and the portal; and h. one or more devices capable of securely accessing a network and viewing and/or entering data in connection therewith;

wherein the provider enrollment module, the consumer enrollment module, the payment collection module and the service fee transfer module comprise software instructions on one or more networks, at least a portion of which are non-public, wherein the software instructions direct one or more computer processors to carry out operations sufficient to implement the function(s) recited for that module;

wherein the database and secure portal are maintained with at least industry-standard security for financial and/or health care data; and wherein the devices comprise one or more of a personal computer, laptop, terminal, netbook, tablet computer, PDA, smart phone, or hand-held device.

In one embodiment, the wellcare management system further comprises an interface module for interfacing the wellcare management system with the provider's practice management system software. The interface module preferably interfaces with the wellcare management system and other software so as to allow information obtained about a consumer from the wellcare management system into a client file associated with the practice management system software. In various embodiments, the practice management system software is administered by a third party.

Preferably, the providers are veterinarians and the wellcare plans comprise one or more wellcare services bundled for a term of one year. The preferred periodic payments are monthly payments.

While not strictly required, the wellcare plans preferably require a one-time enrollment fee that is optionally paid in full or part to a wellcare manager.

The methods and the system described above can be further understood with reference to the Figures. FIG. 1 provides an overview of an embodiment of the methods and the associated wellcare management system.

The system (100) (sometimes referred to herein as "Partners in Wellness" or PIW) can be promoted with advertising or promotions (102) directed to either providers (105), such as hospitals, or directly to consumers (110). Advertising (102) to providers (105) can typically be done through professional journals, trade publications, interne websites, blogs, and the like, as well as through promotional literature directed to doctors, veterinarians, hospital administrators, and other professionals connected to the wellcare industry. Detailed information can also be provided to providers (105) through sales representatives, e.g., field representatives (107) that call on the health service providers (105) directly. Such details can include explanations of the features and benefits of the system and management method for providers (105) and consumers (110).

Demand for the wellcare management system and method also can be driven through advertising to consumers (110) to encourage enrollment, which can be done in several ways. In one approach, consumers (110) are driven to a specific contact point (112) for a specific provider (105), for example a hyperlink, banner, or landing page on a website that will allow the consumer (110) to visit a website for the wellcare manager (105), and/or where the consumer (110) can provide contact information to receive additional information (e.g., for lead generation purposes), or where the consumer (110) may directly enroll into a wellcare plan offered by the provider.

Instead of being directed to a provider-specific contact point, consumers (110) may also be directed to a generic contact point (114), such as a website, where they may enroll by selecting any one of a list (not shown) of providers (105) that are presented to the consumer (110) (e.g., through a drop-down listing on a website). In such a case, the list of providers (105) includes a hyperlink or other means of directing the consumer (110) to a lead-generation or preferably enrollment contact point specific for the listed provider (105) selected by the consumer (110). The skilled artisan will appreciate that, while any type of contact point can be used with the system and method, including telephone number for a consumer to call, an email address for the consumer to contact, or the like, preferred contact points include websites (112, 114) and related methods of allowing the consumer to interact directly and immediately with the information regarding the wellcare management system, and the enrollment process for the system.

Regardless of how the consumer (110) enters the sales process initially (whether through a provider-specific contact or a more generic contact), the consumer is ultimately directed to an enrollment page (120) where contact information and payment information are obtained. Upon enrollment, and more specifically upon submitting the required information on the enrollment page (120), a merchant processor (125) such as a billing and processing management service is notified of the new enrollment. If an initial payment such as an enrollment fee or first periodic payment is due at the time of enrollment, the merchant processor (125) collects that payment. Enrollment materials (130) such as enrollment confirmations, copies of selected wellcare plans, payment terms and preferences, contracts, agreements, legal or regulatory information and/or other materials can be sent to the consumer (110) who has enrolled. Preferably, the materials (130) can be sent by electronic means, such as by email, or other convenient means. Documents may be sent in any convenient or useful format, for example as portable document format (PDF) documents.

Also following enrollment by a consumer, secure access is created for the provider to access payment information related to the enrolled consumer (110) from the merchant processor (125). Secure access for the consumer (110) to a consumer portal account (135) is also created to provide access to the consumer's (110) account as well as self-service updates for account information and payment information.

Subsequent to enrollment by a consumer (110), the provider (105) is also notified of any payment issues or declines that result from the merchant processor's (125) attempts to collect payment from the consumer (110). These declines and related payment issues can be conveniently handled by the decline process module (140), which communicates with the merchant processor (125) and the consumer (110). Specifically, if a decline occurs for a payment transaction, the consumer (110) will receive notice (for example electronically, by email, SMS (text) service, or the like). Such notices can be via the portal to the consumer's portal account (135). If the consumer (110) rectifies the error that resulted in the decline, the decline process module notifies the merchant processor that in turn communicates with the provider. If the decline is not dealt with in a timely manner, e.g., if there is no response or the like, the consumer's (110) account can be placed in a suspended status (144). If the payment problem remains uncorrected, the consumer's account can be designated a collection account or even written off as a loss.

Figure 2:
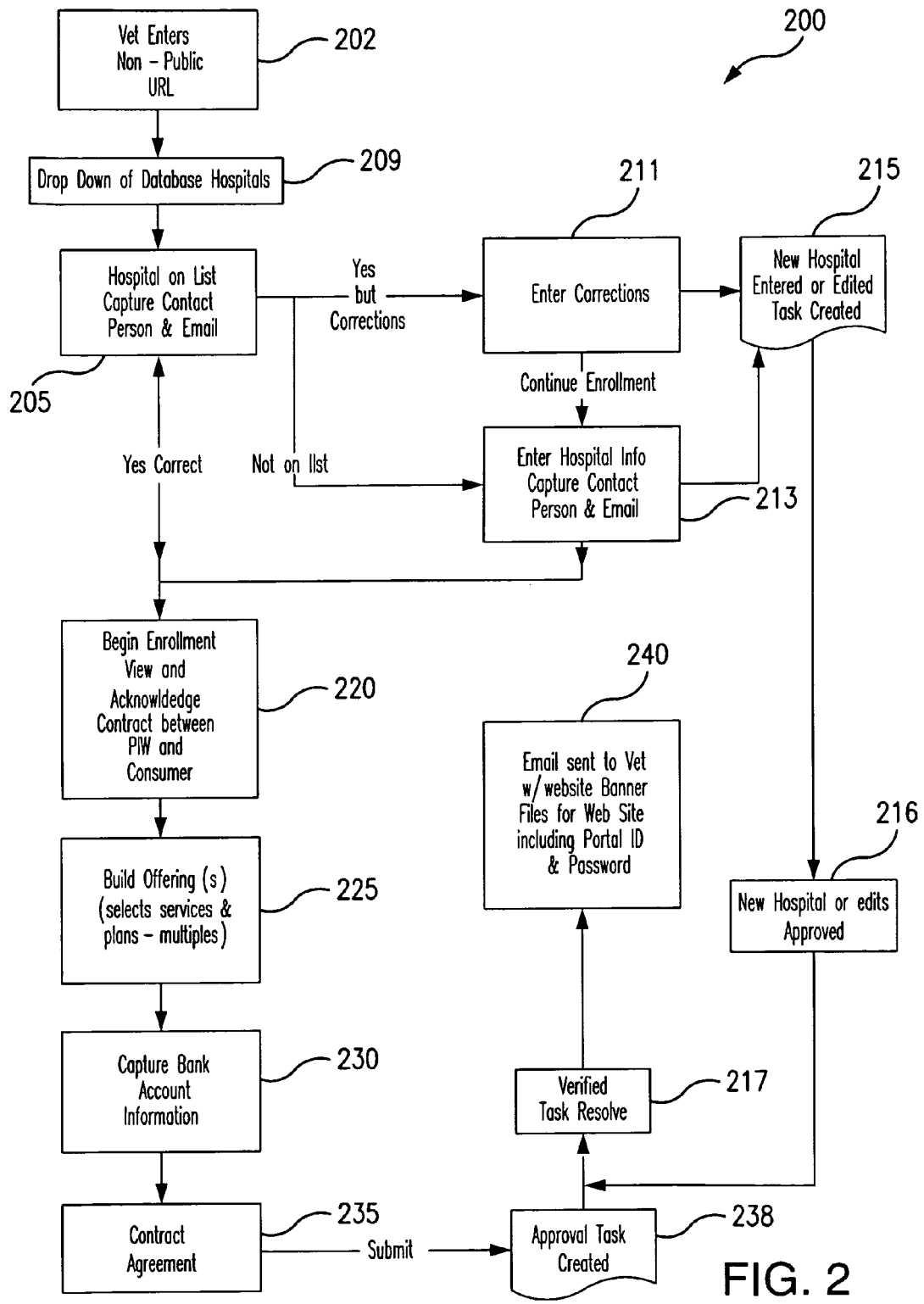
FIG. 2 is a flow chart depicting an embodiment of the provider or hospital enrollment module of the automated wellcare management system.

With further reference to the Figures, FIG. 2 depicts an embodiment of the provider enrollment module (200). A representative (such as a doctor or veterinarian) of the provider can access a secure access point (202) on a network, such as a nonpublic URL. The provider can be for example a hospital, clinic, emergency center, surgical center, doctor's office, veterinarian's office, or the like. After being optionally authenticated, e.g., by entering acceptable login information (such as a correct or authorized username and password) (not shown), access to the enrollment module may be obtained, but is not required. The representative is presented with the option to select the desired provider (205) from a drop-down list (209) or the like. Preferably, the drop-down list (209) is created automatically from a database of providers. If the provider (205) is present on the list, the representative will be prompted to enter information sufficient to identify to proper contact person and contact information, such as email or the like. If the provider (205) is listed but some information needs to be corrected or modified, an opportunity to correct the information is presented via correction input module (211). Upon entering corrected or modified information, a task (215) can be created by the system to create/update/edit any data related to that provider (205) in the system. If the provider (205) is not on the list at all, the provider's information can be entered manually via the provider basic information input module (213). After entering a new provider (205) into the basic information input module (213) the representative will also enter information sufficient to identify the proper contact person for that provider (205) including name, and email and/or other contact information as may be useful. Again the new provider (205) and related information entered via the basic information input module (213) is created/updated/edited via a new task (215) created by the system. Any new or updated information created by the correction module (211) or the basic information input module (213) can be set to require approval (216) prior to finalizing the creation or alteration/editing of any data. Upon approval (216), the task can be verified/resolved (217) as the data are created and/or modified.

Once the provider (205) information is properly entered in the provider enrollment module (200), independent of whether the information was correct on the drop-down list (209), required correction via the correction input module (211), or needed to be entered via the provider basic information input module (213), the provider's representative is preferably then directed to an acknowledgement module (220) to view and acknowledge the contract to set forth the terms between the wellcare manager (aka "Partner in Wellness") and/or merchant processing provider and the consumer. After viewing and acknowledging the contract, the provider (205) or its representative is directed to a module (225) to allow the provider to create/build the provider's service plan offerings. The system can allow pre-constructed plans, plans where the provided can select services from among various options, or completely customized plans.

This module (225) allows the wellcare provider to build or create customized offerings for wellcare plans for their clients (i.e., consumers). The offerings can be completely customized and can comprise one or more services or bundles of services, including one or more health screening options. The offerings can also comprise various tiers and/or price points based on the services included and/or the length or term of the wellcare plan. For example, a more complete plan, or a longer-term plan may provide more potential savings or a better bargain for consumers than a shorter-term plan, or a plan providing fewer services. The system can accommodate a plurality of such service plans for each wellcare provider.

After successfully building one or more service plans/ offerings, the representative is directed to enter financial information sufficient to allow the wellcare manager or merchant processor to pay the wellcare provider (205) amounts due. For example, the wellcare provider's bank account information can be entered in module (230). Subsequently, the provider is presented with the opportunity to review and agree to the contract that defines the relationship between the wellcare provider and the wellcare manager. A provider contract is presented to set forth the terms between the wellcare service provider and the wellcare management provider (wellcare manager). The contract will of course set forth the fees (e.g., one-time and recurring fees) to be paid by the provider to participate in the system and have the wellcare system managed as set forth therein. The provider (205) or its representative can then agree to the contract terms. The provider's (205) agreement (235) to the contract is then indicated prior to the next step. The provider's assent can indicated by any means acceptable, for example signing, e-signing, or clicking through an acceptance of the terms. The provider's agreement (235) or assent to the terms of the contract can be stored in the system for later access, along with a copy of the contract itself.

The representative's contract agreement, provider information, and wellcare offerings are submitted to the wellcare management provider/merchant processor for approval. The enrollment module or system (200) may create a task (238) to set the provider, the service plans, and other details for verification and/or approval, and optionally to provide notice, for example via electronic communication such as via email, to the provider confirming the provider's pending enrollment and/or pending approval. After the verification/approval task (217) is completed, an email (240) or other confirmation is sent to the enrolled provider (205). A unique identifier can be assigned at this time for each provider (205) that enrolls. The provider (205) also receives secure access information for the Provider Portal (not shown) and marketing/advertising information including, for example, links, banner advertisements, social networking buttons or links, and the like specific for the provider, for example based on an identifier unique to that enrolled provider.

Figure 3:
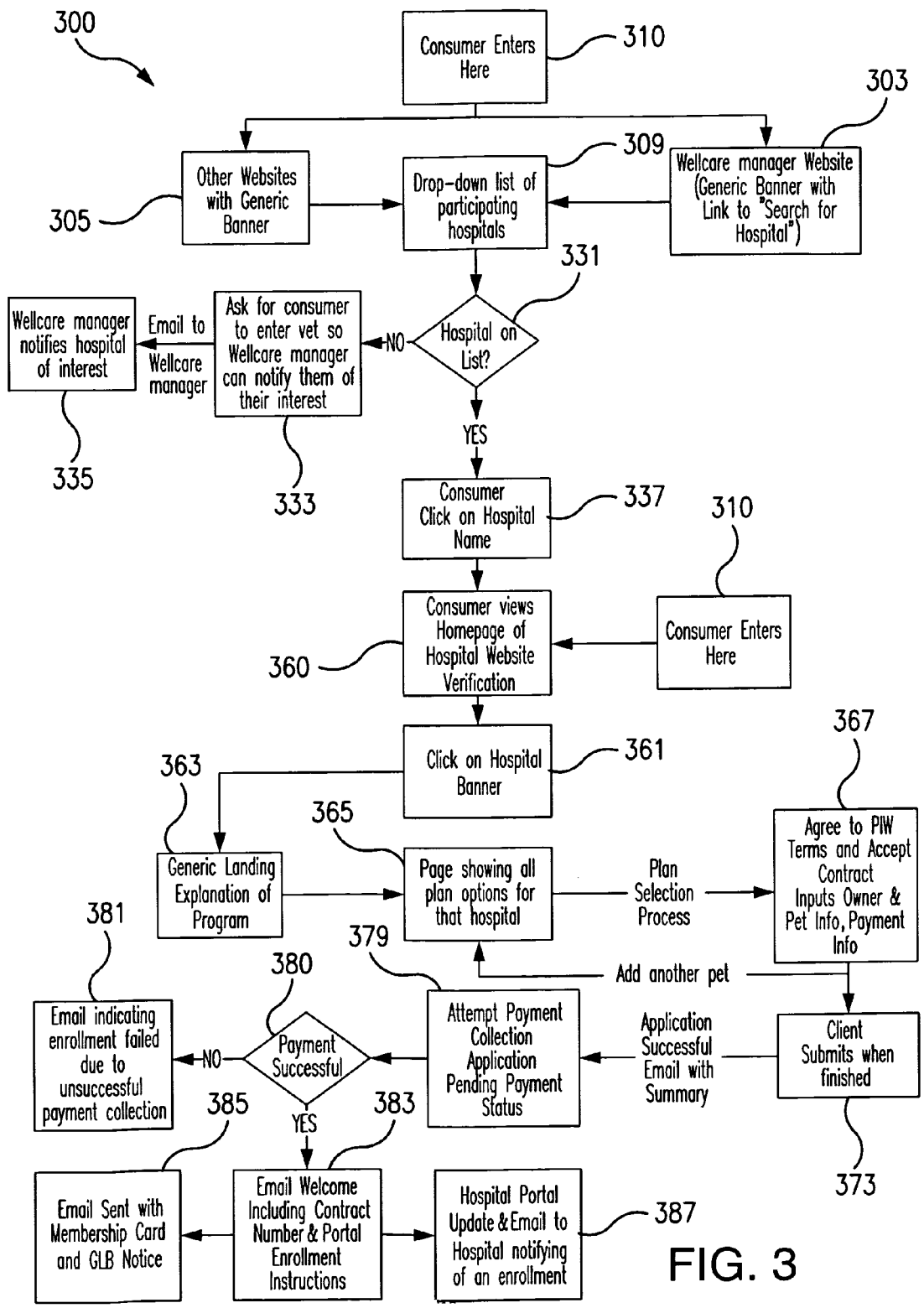
FIG. 3 is a flow chart showing an embodiment of a consumer enrollment module for the automated wellcare management system.

With further reference to the Figures, FIG. 3 represents an embodiment of the consumer enrollment module (300). As can be seen, the consumer (310) can enter at any of several places into the wellcare enrollment process. For example, the consumer (310) can be directed to a website (360) from the provider (e.g., hospital, clinic, or practice) or from a sales process initiated by the provider (discussed below). In the embodiments depicted, the consumer (310) might enter through a public website (303) published by the wellcare manager (or provider). In another embodiment, the consumer (310) enters the enrollment process through another website (305) via an advertisement, e.g., for the wellcare system (e.g., a website featuring a generic banner for the wellcare manager). Unlike the situation where the consumer (310) enters directly as a result of the wellcare provider's marketing efforts, consumers (310) who are attracted via the wellcare manager's efforts are presented with a listing of participating (i.e., enrolled) providers, such as a drop down list (309) from which to select a suitable provider (305). Selection criteria may include any factors, but geographical service areas may be among prime factors determining suitability of a provider (305). If the consumer (310) is interested in a provider (305) not on the list (309) of participating providers, the consumer can choose (331) to optionally provide contact information for their preferred provider via a contact information submission module (333), after which the wellcare manager can contact the nonparticipating provider with notification (335) of the consumer interest.

Where the consumer (310) identifies a desired wellcare provider (305) on the list (309), that provider can be selected, for example, by clicking on a link (337) (e.g., a hyperlink) indicating that provider. The consumer can then be directed to a module such as a website (360) specific for that provider (305). This website (360) provides enough information to enable the consumer (310) to confirm/verify that the provider (305) selected from the list (309) is the desired provider.

Upon verifying that the provider (310) is the provider (310) the consumer (305) intended to select, the consumer can select a further link (361) (e.g., a hyperlink, banner, or the like) to arrive at a series of one or more landing pages (363) leading to the subsequent enrollment process for that provider (310). This portion of the enrollment process begins with a presentation of one or more wellcare plan offerings (365) offered by the selected provider (305) to the consumer (310). The plan selection process module (367) requires the consumer (310) to review and accept the terms and conditions for the wellcare plans, to enter required contact information, to enter required information for each patient being enrolled in a wellcare plan or program, and to enter payment information, for example credit or debit card for periodic billings, checking or other bank account information for automated payment/authorized withdrawals, or the like. The consumer (305) can enter a plurality of patients, pets, or the like into the provider's wellcare plan offerings by simply repeating the process above, with the option of retaining all of the contact and billing information previously entered in the plan selection module (367).

In one embodiment, the provider can provide incentives to their employees by providing them with unique referral or tracking codes each of which track to a specific employee and provide compensation, such as commission for any sales connected to those codes. The skilled artisan will appreciate that such referral codes can be tracked by a variety of techniques such as unique links, affiliate/referral codes, cookies, tracking code, etc., any of which may be useful herewith. In one embodiment, the referral codes can be provided by the employees to consumers, for example current or prospective clients of the hospital, clinic, practice or other provider, in the form of links that will lead to consumer directly to the plan selection process module (367).

Upon completion of the plan selection process module (367) for each patient or pet enrolled, the consumer (310) is directed to submit the completed enrollment information, i.e., the completed submission (373). The consumer's application is assigned a "pending payment" status (379), and the wellcare manager attempts to collect payment (380). If the effort at collecting payment is not successful, a message (381) can be sent to the consumer, for example by email notifying the consumer that the enrollment was not successful as a result of the payment collection problems. In various embodiments, the consumer may be asked to re-verify the financial information provided, or to make other information available. If the effort at collecting payment is successful, a welcome message (383) can be sent to the consumer, for example by email. Following the welcome message (383), a welcome packet (385) can be sent to the enrolled consumer (310) to provide, for example, copies of the consumer's elected wellcare plan offering, membership cards, required legal notices (e.g., notices required by any national (federal), regional (state), or local government such privacy notices, Graham Leach Bliley Act notices), and the like. In addition, the provider's portal (387) is updated, and the provider (305) receives a message (e.g., an email, or a message on or by way of the portal) notifying the provider of the new enrollee and the details in connection therewith. In an alternative embodiment, instead of assigning the consumer's application a "pending payment" status, the consumer is notified of the payment in real time.

Figure 4:
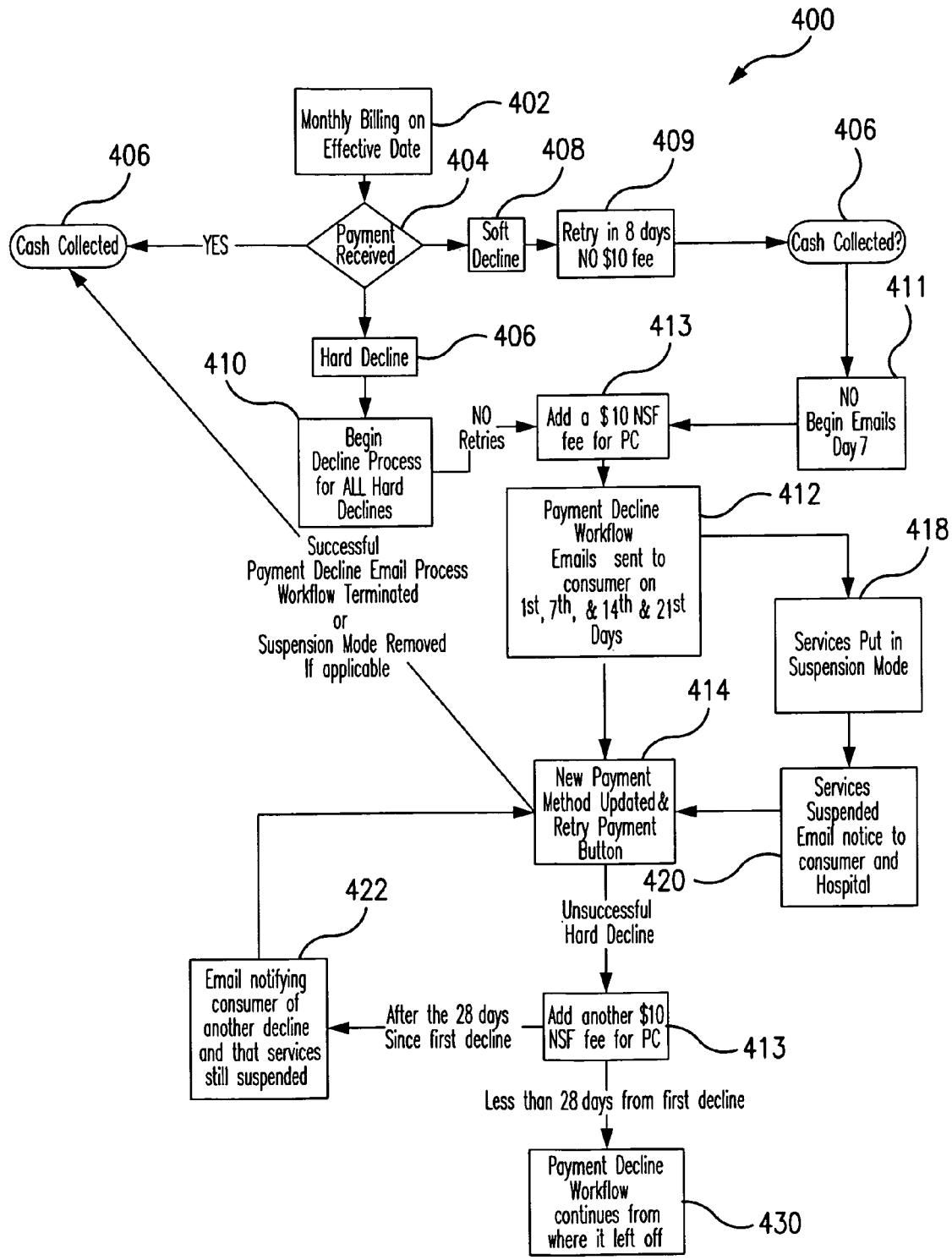
FIG. 4 is a flow chart depicting an embodiment of a payment collection and decline process module for the wellcare management system.

FIG. 4 illustrates an embodiment of the payment collection and decline processing module. In various embodiments, the payment collection module allows for collection of periodic payments. Preferably the payment collection is automatic. Generally the payment period is monthly, however, weekly, biweekly, every 21 days, monthly, quarterly, biannual, and annual payments are all contemplated for use herein, as are combination payments, and irregular payments (different amounts in various periods, or payments in irregular time periods). For example, one payment per year might be a larger payment that includes an annual enrollment or renewal fees, while the remaining payments are smaller payments distributed. Thus while it is expected that normal monthly payments will be used, the system can be fully customized to accommodate unique payment plans and programs.

In the embodiment shown, the payment obligation (402) is triggered on the effective date of the periodic payment, e.g., monthly payment. The merchant processor attempts payment collection (404) via credit card, debit card, authorized account withdrawal, electronic check, electronic funds transfer (EFT), or the like. In some embodiments, cash, traditional checks, or money orders may be accepted by the merchant processor. If the collection is successful (and timely), the payment can be noted to the provider, the consumer receives notification and/or a receipt confirming payment, and the funds are deposited in the merchant processor's account (406) prior to paying services fees owed to the provider.

If the payment is unsuccessful for any reason, the decline management process is initiated. If the failure is a soft decline, a soft decline process will be initiated. Collection will be reattempted one or more times, and if successful, no late fee or additional processing fee need be added. In the depicted embodiment, collection is reattempted after 8 days (409), however, it is to be understood that recollection after a soft decline can be attempted after e.g., 1, 3, 5, 7, or more days as the merchant processor deems appropriate and useful for maximizing collection success rate while minimizing costs of collection for example. If collection after a soft decline is successful, funds are again deposited in the merchant processor's account (406). If recollection of the soft decline is not successful (411) after a predefined period (e.g., after a period of 7 days after the retry) by the soft decline process, the collection is treated exactly as a hard decline thenceforth, i.e. through the decline workflow process (412).

Additionally, although a fee (413) for not sufficient funds (NSF) or the like can be added to compensate the merchant processor or wellcare manager for the additional collection burden for either soft decline or hard declines, the system can utilize a grace period, such that additional fees are imposed only after a set delay, for example, seven days. Preferably, a processing or NSF fee (413) is added to the amount due for soft declines only after such a grace period. In the embodiment depicted, upon a hard decline (406), an NSF fee (413) is immediately added to the client's account, while a soft decline is provided with a grace period, such as seven days.

If a hard decline is encountered, a hard decline process (410) is immediately initiated. There are no further collection attempts since the merchant processor knows they will likely be fruitless. After a hard decline, and also after unsuccessful collection following a soft decline, the consumer's account is suspended and the decline workflow process (412) is initiated whereby one or more payment decline notifications are sent to the consumer by the payment decline workflow module (412). Such notifications can be structured to be sent automatically, for example at 1, 7, 14, and 21 days following the decline. The notifications can contain language with increasing urgency or otherwise designed to urge the consumer to act promptly to rectify the payment problem.

If the consumer provides new payment information (414) in response to one or more of the decline notices (412), a further collection (416) using the new information is attempted. Preferably, the new payment information is provided via a consumer access portal (not shown). If further payment collection (416) is successful, the decline workflow management process (412) is terminated, and the payment is deposited in the merchant processors account (406).

If this further attempt to collect the payment due from the consumer is unsuccessful and results in a hard decline, the consumer is assessed a further NSF fee (413) which may the same or even more than the NSF fee assessed after the first decline, according to the terms of the contract between the consumer and the wellcare manager. If more than a pre-defined time (e.g., more than 28 days) has elapsed since the first hard decline, or since the decline workflow process (412) was initiated, the consumer is notified (422) of the further decline and that the services remain suspended. If less than a pre-defined time (e.g., less than 28 days) have elapsed since the decline workflow process (412) was initiated, the decline continuation module (430) ensures that the payment decline workflow process (412) continues from where it left off.

If the consumer does not respond to the decline workflow notices (412) within a defined period, e.g., 30 days, the consumer's account will be designated for service suspension (418), e.g., as of the decline date. In addition, both the consumer and the provider are notified (420) of the suspension, e.g., by email (420) and/or by notification on the system portal (not shown).

Figure 5:
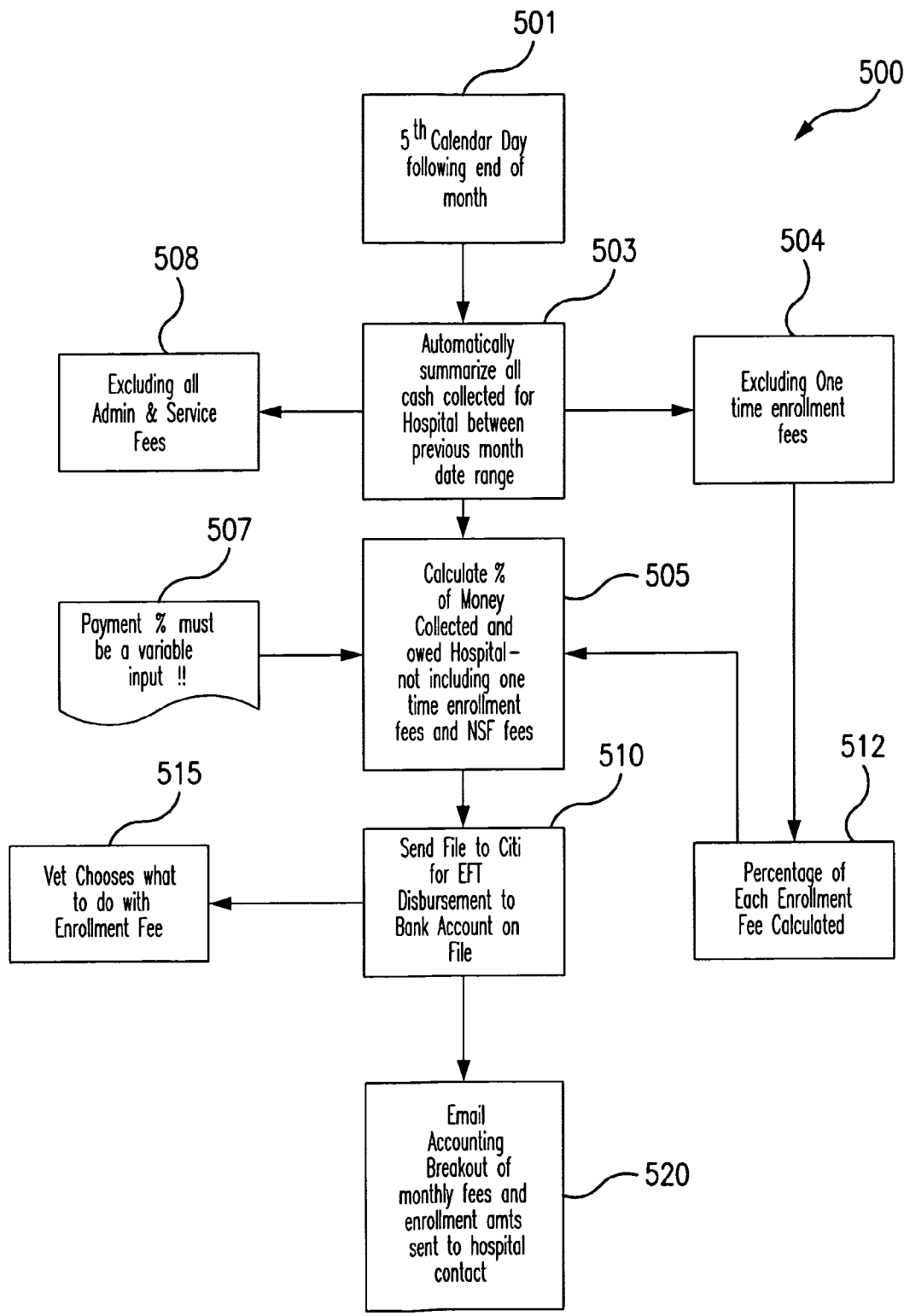
FIG. 5 is a flow chart depicting an embodiment of the hospital payment module for the wellcare management system.

With further reference to the Figures, an embodiment of the module for managing periodic payments to the providers is shown in FIG. 5. The module (500) generally shows how the provider (e.g., hospital, clinic, or practice) receives payments from the merchant processor. As depicted, the payment module is time-triggered (501), for example, a certain number of days after monthly collections are completed, such as the fifth business day following the end of the month. A summary accounting (503) can supplied for each provider to provide a summary of all funds collected on behalf of that provider in the applicable time period since the last accounting, or in a designated date range. The amount paid for services to each provider can be offset based on certain exclusions (504), for example, for one-time enrollment fees and any NSF charges that are retained by the merchant processor or the wellcare manager. A calculation (505) is performed from input data (507) to determine, for example, the amount of payment due the wellcare provider, and any fee due the processor. In certain embodiments, the merchant processor and/or wellcare manager earns a fee that is based (e.g., a percentage) on the amount collected. The amount indicated in the calculation (505) is then adjusted (512) for example to account for any percentage of enrollment fees due the provider, refunds issued to consumers, or the like. An accounting (520) breaking out monthly fees and any enrollments amounts can be sent to the provider, via a provider portal or electronic communication such as email. A file (510) detailing the provider's (payee's) information and the amounts to be paid, for each enrolled provider, is then sent to the payer's bank (e.g., the wellcare manager's bank or merchant processor's bank) for disbursement of funds to the payee's bank account on file.

In addition to accounting for the monthly payments to the providers, the merchant processor and/or wellcare manager also provides accounting (520) for any payments related to enrollment fees. In one embodiment, the provider can reward employees of the provider as a result of the referral codes described above. The wellcare provider submits the accounting for any enrollment fees or percentage thereof, however, ultimately the provider will decide (515) what to do with such fees.

Figure 6:
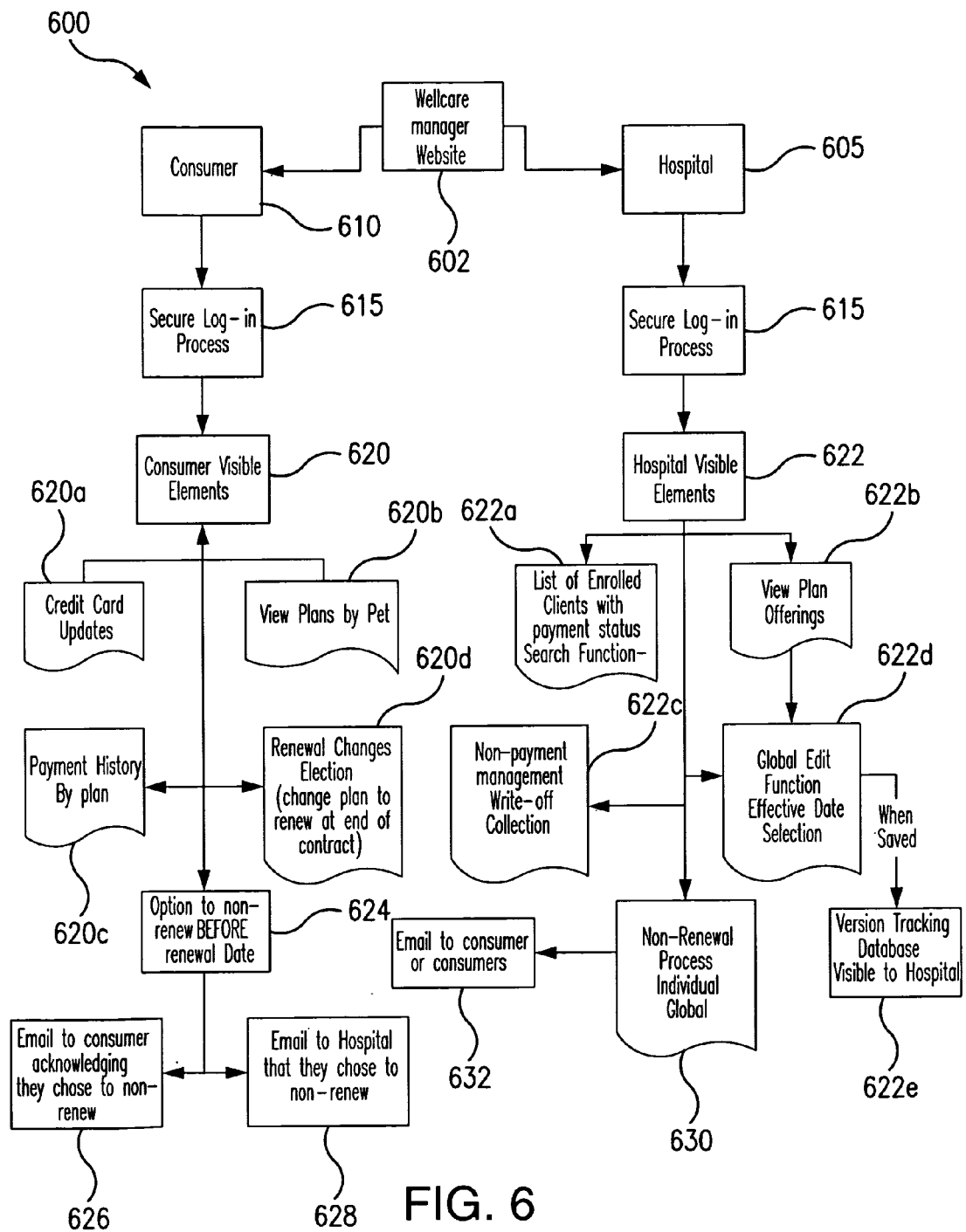
FIG. 6 depicts an embodiment of an access portal module for a wellcare management system, showing portal access for consumers and for providers, such as hospitals or clinics.

FIG. 6 shows a representative embodiment of a portal (600), such as could be accessed through a wellcare manager's website ((602), providing access across a network for consumers (610) and/or providers (605) (e.g., hospitals, clinics, or practices). Preferably, the portal for consumers (610) or providers (605), or both, is via secure access (615), requiring an acceptable username and password to log in. Moreover, consumers (610) only have access to the details associated with their own accounts (consumer visible elements)

(620). Examples of consumer visible elements include credit card information and updates thereto (620a); wellcare plans enrolled in, e.g., by patient or by pet (620b); payment history information (620c) (e.g., by plan or by patient); plan elections and/or renewals elections (620d). Other client visible elements (not shown) may include plan history or changes to plans, effective dates of plans and/or changes thereto, decline and other payment-related notifications; copies of required legal notices; notifications regarding the wellcare management system; notifications regarding new offerings from the provider; ability to review and/or change basic contact information; account preferences including portal preferences and payment preferences.

Providers (605) have access to provider visible elements (622), e.g., information related to the provider, as well as information related to consumers (610) enrolled in one or more of that provider's wellcare plans offered through the system. Examples of provider visible elements include a list of enrolled consumers (610) including payment status, and service status (622a); present and past wellcare plan offerings and changes thereto (622b); non-payment module to manage, e.g., past-due collections and write-offs (622c); a global edit function for plan offerings with effective date selection (622d); and/or version tracking for plan offerings, including changes, effective dates, and the like (622e). Providers may optionally be able to see an approval module (not shown) related to consumers with applications that have provider approval pending status. Other examples of provider visible elements (622) that are not shown include notices regarding service payments from the merchant processor; basic provider contact information, provider financial information, e.g., banking information for payment owed by wellcare manager; employee sales code information, and the like.

The portal can also provide consumers with renewal options. For instance, where the default is for automatic plan renewal on a yearly basis, the portal can provide an option (624) to non-renew prior to the automatic renewal date. The system can then generate messages (626 and 628) to the consumer (610) to confirm the decision not to renew and to the provider (605) to notify of the consumer's non-renewal, respectively. The provider can include a document (630) that explains the consumer's renewal options (including any default renewal decisions selected) and the procedures or details for non-renewal, as well as the consequences thereof with respect to any care under the plan. This renewal document can be delivered to the consumer via an electronic message (632), for example by email or through the portal. The system can auto-deliver the document to all consumers enrolled for a given provider who are up for renewal in the approaching 30, 60, or even 90 days. The document can be delivered once or multiple times, or different versions can be provided at each delivery time. The portal module (600) can optionally allow the provider to authorize refunds (not shown) e.g., for any funds collected prior to receipt of a timely non-renewal decision where those funds are not owed on the present contract/wellcare plan or for care received otherwise.

Figure 7:
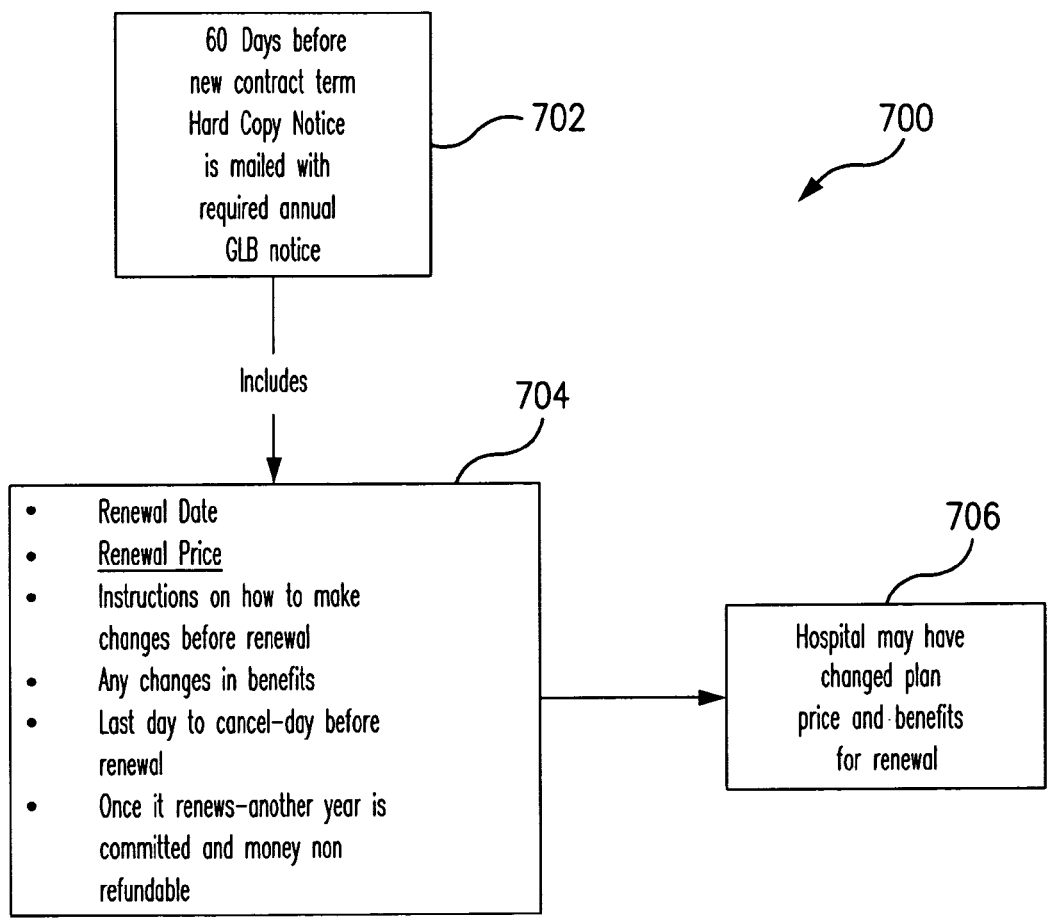
FIG. 7 is a flow chart depicting an embodiment of the renewal process module for the wellcare management system.

The renewal process is further exemplified in FIG. 7. The renewal module (700) is triggered at specified time prior to the expiration of the current wellcare plan, e.g., 30, 60, or even 90 days before. As above, the renewal notice may be sent by an electronic message such as email. If and where required, a physical copy of any renewal notice is provided, for example by regular mail, such as U.S. Mail. Regardless of whether the notice is sent physically, electronically, or both, a copy of the renewal (702) is provided to the consumer along with details of renewal (704), including any changes to the terms or benefits under the existing wellcare plan, and/or any related plans, the total cost of renewal, deadlines for canceling prior to renewal, details regarding financial commitment or refund-ability or non-refund-ability of monies; and copies of any required legal notices or other notices that provider and/or wellcare manager wish to provide. As indicated, changes to the existing plan (706) by the provider should be called out to the consumer for purposes of transparency and clarity, and to prevent any confusion.

Figure 8:
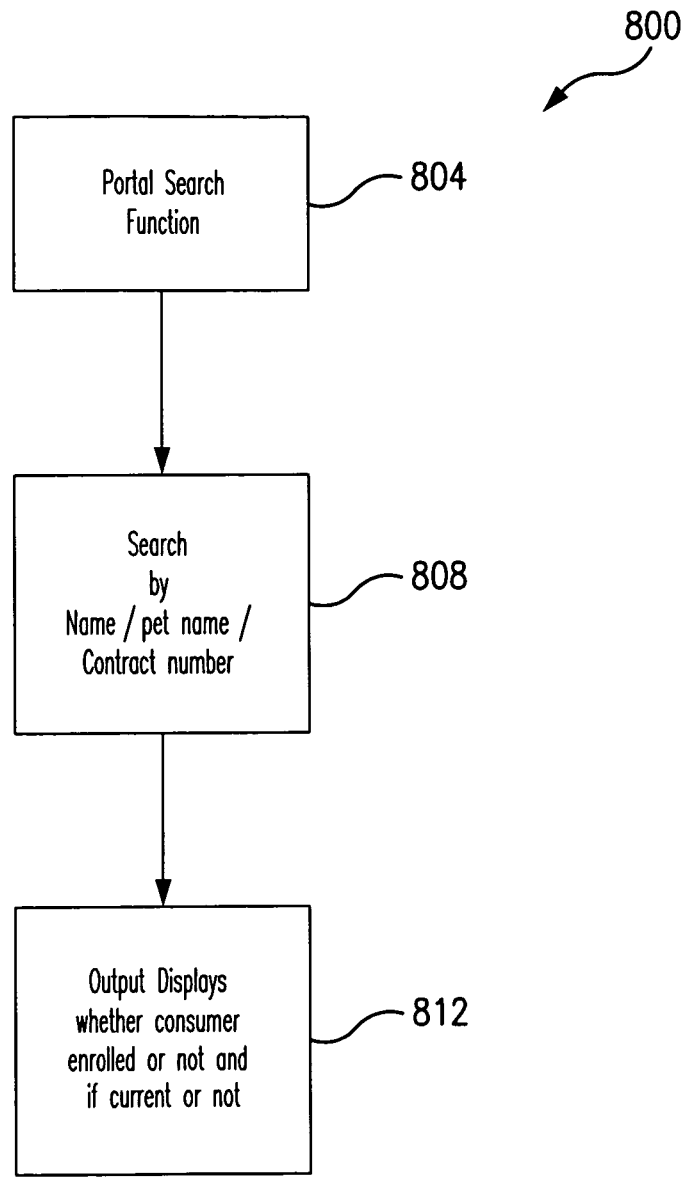
FIG. 8 shows an embodiment of the provider payment verification module for the wellcare management system.

FIG. 8 depicts further aspects of invention, specifically an embodiment of an optional provider payment verification module (800). The provider can check any consumer's enrollment and/or payment status from the portal (600) described above. In another embodiment, the provider can access search module (804) on the portal or optionally in a desktop widget or program that can quickly and easily provide access to view the payment information. The search module (804) provides a search functionality (808) that permits the provider to search the consumer payment information by name, by patient or pet name, by member number or other detail, or by payment status. The output (812) can include any related data, such as the enrollment status, payment status, and renewal status/time to expiration/renewal of reach of the provider's enrolled consumers. This module can be useful so that the provider can verify the payment and/or enrollment status of each consumer prior to rendering additional services.

Figure 9:
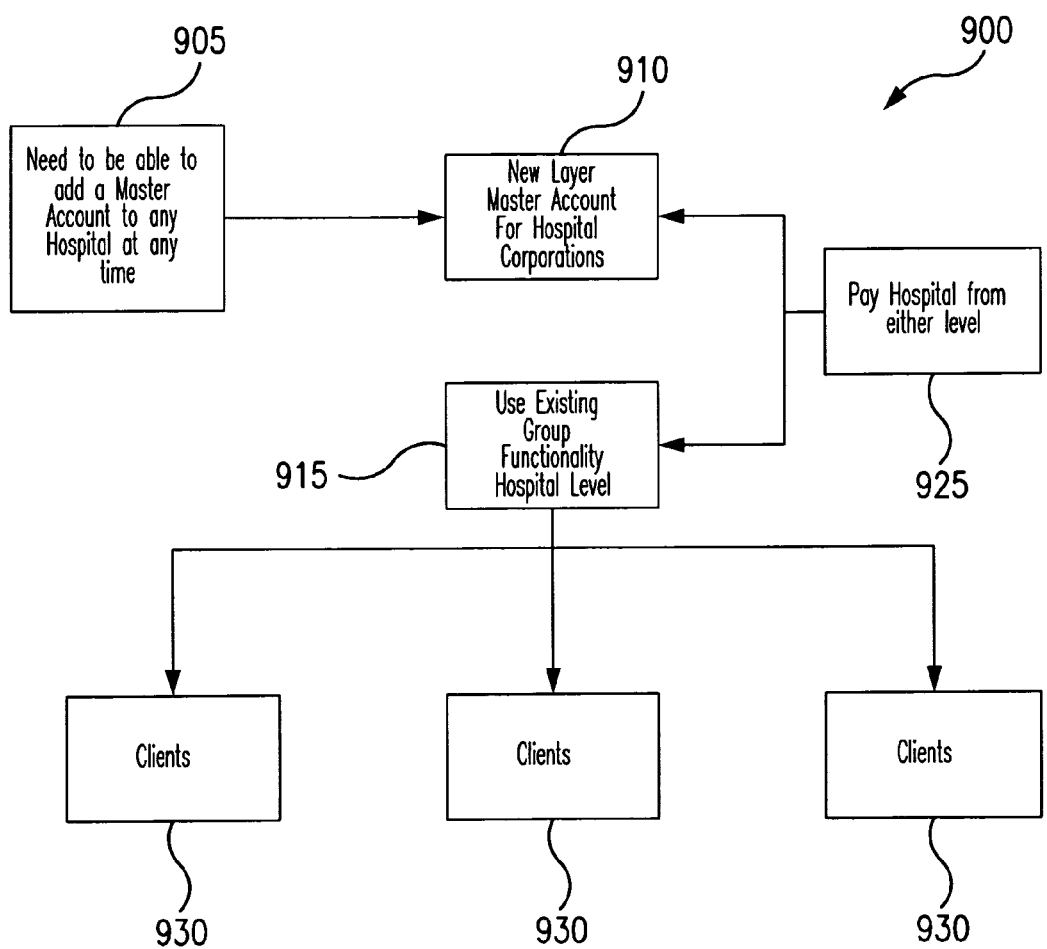
FIG. 9 depicts an embodiment of a hierarchy-tracking module for the wellcare management system.

With additional reference to the Figures, FIG. 9 provides a flow chart for an embodiment of a hierarchy-tracking module (900) for the wellcare management system. This module is particularly useful for provider groups or organizations that have multiple locations, offices, clinics, hospitals or the like operating under a single business entity or having pooled or common business interests such that they operate as a buying group, or the like. In such cases, it may be useful or necessary to have multiple account levels to cover the various locations, offices, clinics, hospitals, or the like. For example, each location or office may need to be able access information related to that particular location. However, for accounting, tracking, or other purposes, one or more "master level" accounts may be required to allow access to all clients and or all accounting for the entire organization or corporation—all locations, offices, or the like. Accordingly, the hierarchy module (900) allows a master account (905) to be added at any time. Thus, a new layer/master account (910) can be added on top of existing functionality (915) for any given provider. Payments (920) can be made either to the master account created via the new layer (910) or via the existing provider functionality (915). Providers can access and/or review data associated with clients (930) via either the master layer/account (910) or via the existing provider functionality (915) for each location, office, clinic, or hospital. The wellcare provider and/or the master account can determine the access privileges for the existing functionality/provider level account with respect to viewing client data from other provider locations that are part of the same master group. In one embodiment, the individual provider accounts can only access data for clients the enrolled through that provider originally. In another embodiment, each provider within a master group can access data for all clients (930) that are enrolled in connection with the master group. For example an imaging center can access the consumer/client data for a veterinarian's office that is part of the same organization or master group without have to contact the master account administrator.

Figure 10:
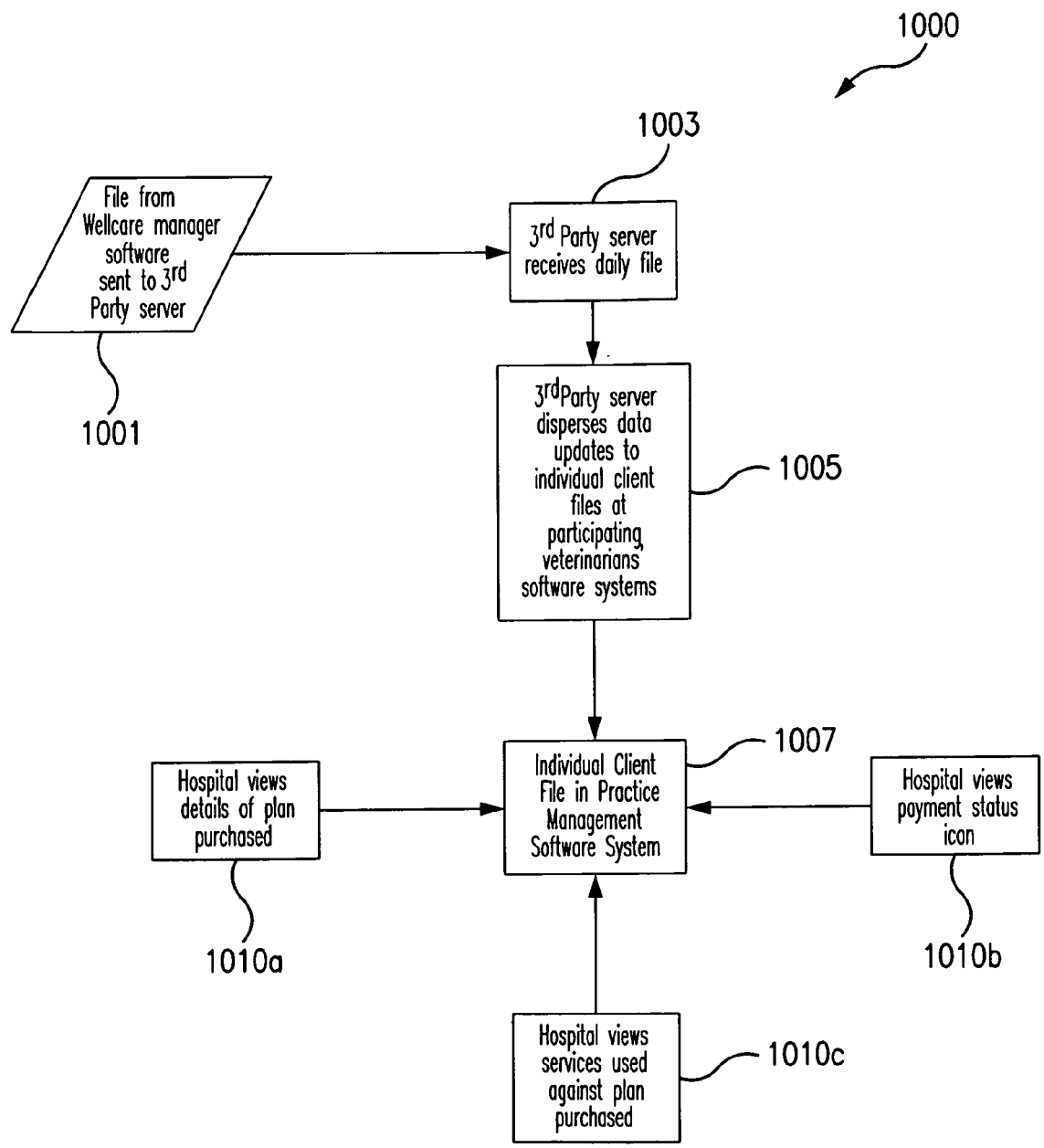
FIG. 10 is a flow chart showing an embodiment of the update module for the wellcare management system.

In various embodiments, an optional module in included for providing an interface between the wellcare management system and a practice management software and/or calendaring software used by the wellcare provider to provide updates. An embodiment of such a module is depicted in FIG. 10.

Preferably, the interface module (1000) is designed for periodic updates based on enrollment status, plan purchases, and/or payment status for consumers associated with a given provider. A file (1001) is generated periodically by the wellcare manager and sent to a server (1003) generally operated by a 3rd party, or optionally by the provider itself. The server (1003) receives the file when transmitted by the wellcare manager, i.e., on a regular basis, preferably daily, or several times per week. The contents of the file include information related to the plan purchased by each consumer for a given provider, and the enrollment and payment status for each such consumer. In a preferred embodiment, the server is operated by a 3rd party that provides practice management software service to multiple care providers, and which can dispense the information in the file to the individual providers that subscribe to its practice management services. The practice management service provider preferably dispenses (1005) the periodic updates such that the individual client files in the provider's practice management software are updated. The updated client files (1007) in the individual provider's practice management software can be accessed and viewed by the provider's staff including service providers and accounting personnel. Among the convenient provider views (1010) are views of the plan(s) purchased (1010*a*); payment status (1010*b*); and/or comparing services used versus plan purchased or services covered thereunder (1010*c*).

In another aspect, consistent with the methods and system provide herein, the invention provides articles of manufacture comprising a computer-readable storage medium having software stored thereon that, in response to execution by a processor, causes the processor to perform one or more functions comprising:
  a. enrolling a plurality of wellcare providers;
  b. enrolling one or more consumers for each enrolled provider;
  c. for each provider, offering one or more wellcare plans to consumers;
  d. allowing the consumers to select from the one or more wellcare plan offerings;
  e. permitting consumers to enroll one or more patients per plan;
  f. for each consumer, obtaining contact and financial information sufficient to permit automated collection by a merchant processor of periodic payments connected to the wellcare plan selected;
  g. for each provider, obtaining financial information sufficient to permit payment of service fees to the provider from the wellcare manager;
  h. collecting and/or processing periodic payments from consumers using automated payment management including approval and/or decline notification and management thereof;
  i. for each consumer enrolled, managing renewals and/or nonrenewals; and
  j. providing access over a network to a secure portal providing information to the providers and consumers.

In one embodiment of the article of manufacture, the software stored on the computer-readable storage medium further comprises software that causes the processor to perform functions comprising: interfacing information obtained about a consumer from any one or more of functions (a) through (j) into a client file in a provider's practice management system software.

In the specification, there have been disclosed typical preferred embodiments of the invention. Although specific terms are employed, they are used in a generic and descriptive sense only and not for purposes of limitation. The scope of the invention is set forth in the claims. Many modifications and variations of the invention are possible in light of the above teachings. It is therefore to be understood that within the scope of the appended claims, the invention may be practiced otherwise than as specifically described.

What is claimed is:

1. A method of wellcare management comprising: (a) enrolling a plurality of wellcare providers; (b) enrolling one or more consumers for each enrolled provider; (c) for each provider, offering a plurality of different customized wellcare plans to consumers; (d) allowing the consumers to select from the wellcare plan offerings; (e) permitting consumers to enroll one or more patients, wherein one consumer is permitted to enroll a plurality of patients, each patient into a different plan; (f) for each consumer, obtaining contact and financial information sufficient to permit automated collection by a merchant processor of a periodic payment associated with the selected wellcare plan; (g) for each provider, obtaining financial information sufficient to permit payment of service fees to the provider from the wellcare manager; (h) collecting and/or processing periodic payments from consumers using automated payment management including approval and/or decline notification and management thereof; (i) for each consumer enrolled, managing renewals and/or nonrenewals; and (j) providing access over a network via a secure portal to providers and consumers to information about the wellcare plans and payments; wherein steps (a) through (j) occur on one or more computer networks and at least step (j) further comprises, for either or both consumers or providers, data processing elements controlling one or more of: (1) registering the consumer or provider as a user of the computer network via the secure portal (2) entering a user name and password; (3) authenticating the user name or password to generate an authenticated user; (4) restricting the authenticated user to only information pertinent to that user; (5) directing information input by the user to an appropriate module for further processing; and (6) follow up communication between two or more modules or between the consumer, the provider and/or the wellcare manager regarding information input by a user.

2. The method of claim 1 wherein each offered plan provides one or more of: (i) a different wellcare service or bundle of wellcare services; (ii) one or more periodic payment requirements or options for the plan; and (iii) one or more terms for the plan.

3. The method of claim 1 wherein the step of managing renewals and/or nonrenewals comprises timely communication with the consumers.

4. The method of claim 1 further comprising the step of creating and maintaining a database comprising: (i) for each enrolled provider, data related to one or more of (1) contact information for the provider; (2) an identifier unique for the provider; (3) financial information sufficient to permit payments of service fees to the provider from the wellcare manager; (4) the content of one or more provider wellcare plan offerings; (5) operative and/or effective dates for each of the one or more provider wellcare plans; (6) any changes to the one or more provider wellcare plan offerings and effective dates of the changes; (7) records of notice of the changes to the consumers; (8) records of receipt and/or acceptance of such notice by the consumers; (9) information related to each enrolled consumer and each patient enrolled thereunder for each wellcare plan offered by that provider; (10) enrollment and/or payment status for each enrolled consumer including the status of any payment problems or denials; and (ii) for each enrolled consumer, data related to one or more of: (1) contact information for the consumer; (2) information to associate the consumer with an enrolled provider; (3) information identifying the wellcare plan offering(s) for which the consumer has enrolled; (4) information for each patient enrolled in each wellcare plan; (5) an account history for the consumer; (6) financial information sufficient to permit electronic collection of payments due by the merchant processor; (7) payment preference(s) for the consumer; (8) renewal or non-renewal information for the consumer; and (9) information related to access by the consumer to a secure portal providing information about the plan.

5. The method of claim 4 wherein the step of providing access over a network to a secure portal comprises: (i) for enrolled providers, said portal allowing access to data in the database related to the provider; the wellcare plan offerings; approval status for completed consumer applications; the enrolled consumers and/or patients for that provider; payment transfer status for the provider from the merchant processor; payment and/or enrollment status for each consumer or patient associated with that provider; decline notifications for any consumer associated with that provider; and/or renewal status for each consumer; and (ii) for enrolled consumers, said portal allowing access sufficient for managing that consumer's data in the database as to consumer contact information, services selected, enrolled patients, financial information, and/or preferred methods of payments; accessing account history, payment history, and/or service history; rectifying payment issues or declines, and making renewal decisions.

6. The method of claim 1 wherein the providers are veterinarians and the wellcare plan offerings comprise one or more wellcare services bundled for a term of one year.

7. The method of claim 1 wherein the periodic payments are monthly payments.

8. The method of claim 1 wherein the wellcare plans require a one-time enrollment fee that is paid to a wellcare manager.

9. The method of claim 1 wherein at least a portion of the one or more computer networks is non-public.

10. The method of claim 4 wherein the database is kept private and maintained securely based on industry standards and legal requirements for financial data and/or health records.

11. The method of claim 1 further comprising the step of interfacing information gathered from any of steps (a) through (j) with a provider's practice management system software.

12. The method of claim 11 wherein the practice management system software is administered by a third party and the information gathered is information about a consumer in the method that is entered into a client's file in the practice management system software.

13. A wellcare management system operated by a wellcare manager or merchant processor comprising: (a) a provider enrollment module for enrolling a plurality of wellcare providers; (b) a consumer enrollment module for enrolling one or more consumers for each enrolled provider and one or more patients for each consumer into one or more wellcare plans offered by the enrolled provider, wherein one consumer is permitted to enroll a plurality of patients, each patient into a different plan; (c) a payment collection module comprising billing and collection services including one or more of (i) periodic invoicing or billing of consumers; (ii) automated payment collection and processing; (iii) automated payment management including approval and/or decline notification and management; and (iv) renewal management; (d) a service fee transfer module for paying service fees to each enrolled provider less any fees due the wellcare manager or merchant processor; (e) a database comprising: (i) for each enrolled provider, data related to one or more of (1) contact information for the provider; (2) an identifier unique for the provider; (3) financial information sufficient to permit payment of service fees to the provider from the wellcare manager; (4) the content of one or more provider wellcare plan offerings; (5) operative and/or effective dates for each of the one or more provider wellcare plans; (6) any changes to the one or more provider wellcare plan offerings and effective dates of the changes; (7) records of notice of the changes to the consumers; (8) records of receipt and/or acceptance of such notice by the consumers; (9) information related to each enrolled consumer and each patient enrolled thereunder for each wellcare plan offered by that provider; and (10) enrollment and/or payment status for each enrolled consumer including the status of any payment problems or denials; and (ii) for each enrolled consumer, data related to one or more of: (1) contact information for the consumer; (2) information to associate the consumer with an enrolled provider; (3) information identifying the wellcare plan offering(s) for which the consumer has enrolled; (4) information for each patient enrolled in each wellcare plan; (5) an account history for the consumer; (6) financial information sufficient to permit electronic collection of payments due by the merchant processor; (7) payment preference(s) for the consumer; (8) renewal or non-renewal information for the consumer; and (9) information related to access by the consumer to a secure portal providing information about the plan; (f) a secure portal access module providing access: (i) for enrolled providers, wherein said portal allows access to data in the database related to the provider; the wellcare plan offerings; approval status for completed consumer applications; the enrolled consumers and/or patients for that provider; status of payment of service fees to the provider from the wellcare manager; payment and/or enrollment status for each consumer or patient associated with that provider; decline notifications for any consumer associated with that provider; and/or renewal status for each consumer; and (ii) for enrolled consumers, wherein said portal allows access sufficient for managing that consumer's data in the database as to consumer contact information, services selected, enrolled patients, financial information, preferred methods of payments, and/or accessing account history, payment history, service history, rectifying payment issues or declines, and renewal decisions; (g) one or more servers providing access to the database and the portal; and (h) one or more devices capable of securely accessing a network and viewing and/or entering data in connection therewith; wherein the provider enrollment module, the consumer enrollment module, the payment collection module and the service fee transfer module comprise software instructions on one or more networks, at least a portion of which are non-public, wherein the software instructions direct one or more computer processors to carry out operations sufficient to implement the function(s) recited for that module; wherein the database and secure portal are maintained with at least industry-standard security for financial and/or health care data; and wherein the devices comprise one or more of a personal computer, terminal, netbook, tablet computer, personal digital assistant (PDA), smart phone, or hand-held device, wherein the system comprises, for either or both consumers or providers, data processing elements controlling one or more of: (1) registering the consumer or provider as a user of the computer network via the secure portal (2) entering a user name and password; (3) authenticating the user name or password to generate an authenticated user; (4) restricting the authenticated user to only information pertinent to that user; (5) directing information input by the user to an appropriate module for further processing; and (6) follow up communication between two or more modules or between the consumer, the provider and/or the wellcare manager regarding information input by a user.

14. The wellcare management system of claim 13 further comprising an interface module for interfacing the wellcare management system with the provider's practice management system software.

15. The wellcare management system of claim 14 wherein the interface module interfaces information obtained about a consumer from the wellcare management system into a client file in the practice management system software.

16. The wellcare management system of claim 14 wherein the practice management system software is administered by a third party.

17. The system of claim 13 wherein the providers are veterinarians and the wellcare plans comprise one or more wellcare services bundled for a term of one year.

18. The system of claim 13 wherein the periodic payments are monthly payments.

19. The system of claim 13 wherein the wellcare plans require a one-time enrollment fee that is paid to a wellcare manager.

20. An article of manufacture comprising a computer-readable storage medium having software stored thereon that, in response to execution by a processor, causes the processor to perform functions comprising: (a) enrolling a plurality of wellcare providers; (b) enrolling one or more consumers for each enrolled provider; (c) for each provider, offering a plurality of wellcare plans to consumers; (d) allowing the consumers to select from the one or more wellcare plan offerings; (e) permitting consumers to enroll one or more patients, wherein one consumer is permitted to enroll a plurality of patients, each patient into a different plan; (f) for each consumer, obtaining contact and financial information sufficient to permit automated collection by a merchant processor of periodic payments connected to the wellcare plan selected; (g) for each provider, obtaining financial information sufficient to permit payment of service fees to the provider from the wellcare manager; (h) collecting and/or processing periodic payments from consumers using automated payment management including approval and/or decline notification and management thereof; (i) for each consumer enrolled, managing renewals and/or nonrenewals; and (j) providing access over a network to a secure portal providing information to the providers and consumers and at least step (j) further comprises, for either or both consumers or providers, data processing elements controlling one or more of: (1) registering the consumer or provider as a user of the computer network via the secure portal (2) entering a user name and password; (3) authenticating the user name or password to generate an authenticated user; (4) restricting the authenticated user to only information pertinent to that user; (5) directing information input by the user to an appropriate module for further processing; and (6) follow up communication between two or more modules or between the consumer, the provider and/or the wellcare manager regarding information input by a user.

21. The article of manufacture of claim 20 wherein the software stored on the computer-readable storage medium further comprises software that causes the processor to perform functions comprising interfacing information obtained about a consumer from any one or more of functions (a) through (j) into a client file in a provider's practice management system software.

* * * * *